(12) United States Patent
Dimig et al.

(10) Patent No.: US 7,111,480 B2
(45) Date of Patent: Sep. 26, 2006

(54) STEERING COLUMN LOCK APPARATUS AND METHOD

(75) Inventors: Steven J. Dimig, Plymouth, WI (US); Larry R. Grimmer, Sussex, WI (US); Russell J. Winberg, Wauwatosa, WI (US); Michael Malich, Greenfield, WI (US); Michael P. Baker, Evanston, IL (US); Cynthia M. Brey, Peoria, IL (US); Brian M. Keller, Menasha, WI (US)

(73) Assignee: Strattec Security Corporation, Milwaukee, MI (US)

( * ) Notice: Subject to any disclaimer, the term of this patent is extended or adjusted under 35 U.S.C. 154(b) by 0 days.

(21) Appl. No.: 10/453,903

(22) Filed: Jun. 3, 2003

(65) Prior Publication Data

US 2004/0031299 A1 Feb. 19, 2004

Related U.S. Application Data

(63) Continuation of application No. 09/757,299, filed on Jan. 9, 2001, now Pat. No. 6,571,587.

(51) Int. Cl.
B60R 25/02 (2006.01)
(52) U.S. Cl. ...................................... 70/186
(58) Field of Classification Search .......... 70/182–186, 70/252
See application file for complete search history.

(56) References Cited

U.S. PATENT DOCUMENTS

| | | |
|---|---|---|
| 3,241,344 A | 3/1966 | Peters |
| 3,590,611 A | 7/1971 | Nakashima ................. 70/186 |
| 3,613,412 A | 10/1971 | Yamaguchi |
| 3,709,006 A | 1/1973 | Seidewand .................. 70/377 |
| 3,779,332 A | 12/1973 | Snitgen ....................... 180/112 |
| 3,789,636 A | 2/1974 | Nakashima .................. 70/252 |
| 3,959,996 A | 6/1976 | Thirion ........................ 70/186 |
| 3,985,009 A * | 10/1976 | Lipschutz .................... 70/252 |
| 4,137,985 A | 2/1979 | Winchell .................... 180/114 |
| 4,248,070 A | 2/1981 | Eichenauer .................. 70/252 |
| 4,250,976 A | 2/1981 | Mochida .................... 180/271 |
| 4,332,306 A | 6/1982 | Turatti ........................ 180/287 |
| 4,426,864 A | 1/1984 | Morikawa .................... 70/431 |
| 4,428,024 A | 1/1984 | Mochida et al. ............ 361/172 |
| 4,583,148 A | 4/1986 | Lipschutz ................... 361/172 |

(Continued)

FOREIGN PATENT DOCUMENTS

DE 3611483 9/1987

(Continued)

*Primary Examiner*—Lloyd A. Gall
(74) *Attorney, Agent, or Firm*—Michael Best & Friedrich LLP

(57) ABSTRACT

Highly preferred embodiments of the present invention have a lock bolt extendible and retractable by movement of a power transmission assembly driven by an actuator and having a cam thereon which cams against the lock bolt to retract the lock bolt and unlock the steering column. In some preferred embodiments, the cam has a curved surface with varying distance from the axis of rotation of the cam or pivot to produce smooth and controlled lock bolt camming action with little to no jarring motion. In order to significantly reduce manufacturing and assembly time and cost, some or all of the power transmission assembly can be assembled prior to installation in the lock assembly frame. More preferably, some or all of the power transmission assembly is integrally formed. Preferably, part or all of the lock assembly can be assembled without turning, flipping, or otherwise re-orienting the lock assembly during assembly.

10 Claims, 5 Drawing Sheets

U.S. PATENT DOCUMENTS

| | | | |
|---|---|---|---|
| 4,603,564 A | 8/1986 | Kleinhany et al. | 70/277 |
| 4,638,882 A | 1/1987 | Sato | 180/287 |
| 4,643,009 A | 2/1987 | Sato | 70/252 |
| 4,716,748 A | 1/1988 | Watanuki et al. | 70/252 |
| 4,761,645 A | 8/1988 | Mochida | 340/825.31 |
| 4,827,744 A | 5/1989 | Namazue et al. | 70/252 |
| 4,848,115 A | 7/1989 | Clarkson et al. | 70/276 |
| 4,898,010 A | 2/1990 | Futami et al. | 70/257 X |
| 4,939,915 A | 7/1990 | Vonlanthen | 70/277 |
| 4,982,584 A | 1/1991 | Takeda et al. | 70/252 |
| 5,036,687 A | 8/1991 | Takeuchi et al. | 70/186 |
| 5,255,547 A | 10/1993 | Burr et al. | 70/252 |
| 5,315,851 A | 5/1994 | Kuroki | 70/252 |
| 5,343,077 A | 8/1994 | Yoshida et al. | 70/256 X |
| 5,398,532 A | 3/1995 | Janssen et al. | 70/252 |
| 5,454,238 A | 10/1995 | Ross et al. | 70/186 |
| 5,654,689 A | 8/1997 | Peyre et al. | 340/426 |
| 5,656,867 A | 8/1997 | Kokubu | 307/10.5 |
| 5,656,868 A | 8/1997 | Gottlieb et al. | 307/10.6 |
| 5,718,132 A | 2/1998 | Riefe et al. | 70/186 |
| 5,808,372 A | 9/1998 | Schwegler et al. | 307/10.3 |
| 5,808,543 A | 9/1998 | Peyre | 340/426 |
| 5,811,887 A | 9/1998 | Peyre et al. | 307/10.3 |
| 5,893,429 A | 4/1999 | Hackl et al. | 180/443 |
| 5,896,765 A | 4/1999 | Peyre et al. | 70/186 |
| 5,965,955 A | 10/1999 | Takanohashi | 307/10.5 |
| 5,982,295 A | 11/1999 | Goto et al. | 70/252 X |
| 5,990,574 A | 11/1999 | Lecznar et al. | 307/10.5 |
| 5,992,263 A | 11/1999 | Bleuel et al. | 74/493 |
| 6,003,349 A | 12/1999 | Nagae et al. | 70/186 |
| 6,006,561 A | 12/1999 | Hill et al. | 70/276 |
| 6,011,321 A | 1/2000 | Stancu et al. | 307/10.5 |
| 6,040,638 A | 3/2000 | Howell | 307/10.2 |
| 6,053,067 A | 4/2000 | Garnault et al. | 74/492 |
| 6,067,007 A | 5/2000 | Gioia | 340/426 |
| 6,067,824 A | 5/2000 | Osborne | 70/252 |
| 6,078,293 A | 6/2000 | Yamamoto | 343/713 |
| 6,107,914 A | 8/2000 | Greene | 340/426 |
| 6,125,671 A | 10/2000 | Suzuki | 70/186 |
| 6,127,922 A | 10/2000 | Roddy et al. | 340/426 |
| 6,233,986 B1 | 5/2001 | Suzuki et al. | 70/186 |
| 6,295,848 B1 | 10/2001 | Suzuki | 70/186 |
| 6,324,878 B1 | 12/2001 | Ramamurthy et al. | 70/186 |
| 6,508,088 B1 | 1/2003 | Barbier et al. | 70/186 |
| 6,571,587 B1 * | 6/2003 | Dimig et al. | 70/186 |

FOREIGN PATENT DOCUMENTS

| | | |
|---|---|---|
| DE | 4434655 | 4/1995 |
| EP | 0094568 | 11/1983 |
| EP | 0240724 | 10/1987 |

* cited by examiner

STEERING COLUMN LOCK APPARATUS AND METHOD

RELATED APPLICATIONS

This application is a continuation of U.S. patent application Ser. No. 09/757,299 filed on Jan. 9, 2001, and now U.S. Pat. No. 6,571,587.

FIELD OF THE INVENTION

The present invention relates to locks and locking methods, and more particularly to devices and methods for locking and unlocking vehicle steering columns.

BACKGROUND OF THE INVENTION

Numerous devices and methods exist for locking a vehicle steering column from movement. Most commonly, such devices and methods prevent the steering column from being rotated to steer the vehicle. The vehicle can be a car, van, truck, motorcycle, bus, or all-terrain vehicle having a number of wheels, a boat with one or more rudders, a snowmobile with skis, a vehicle having one or more tracks, and the like. A steering column lock used in any such vehicle is typically employed to prevent vehicle theft or unauthorized use.

A popular and well-known mechanism for locking a steering column is a lock bolt that is spring-loaded into direct or indirect releasable engagement with the steering column. Such engagement can be by removable insertion of the lock bolt into a groove, a notch, teeth, or an aperture in the steering column or in a gear, plate, or other element connected to the steering column. A mechanism is normally provided for retracting the lock bolt against the spring-loaded force to unlock the steering column for vehicle operation. As is well known to those skilled in the art, the mechanism can retract the lock bolt in response to user insertion and turning of a key or in response to one or more signals from a control system coupled to an actuator driving the mechanism.

Common design concerns with steering column locks include the ability of a lock to reliably lock the steering column and protection against the lock bolt engaging and locking the steering column during vehicle operation. For example, the lock bolt of a steering column lock should be able to properly extend and engage with the steering column (or element connected thereto as described above) even when the steering column is being turned. As another example, a familiar problem with many conventional steering column locks is the ability of a user to turn an inserted ignition key when turning force exists upon steering column from the front wheels of the vehicle. After the lock bolt has been inserted into the groove, notch, teeth, aperture and the like in its extended and locked position, a turning force from the front wheels can bind the lock bolt in this position. Typically, the user must turn the steering wheel to release the binding force upon the lock bolt in order to turn the ignition key, retract the lock bolt, and thereby unlock the steering column.

While lock bolt binding is not necessarily a critical design flaw in conventional manually-actuated steering column locks, it can be much more significant in newer steering column locks that are not mechanically connected to an ignition lock cylinder for actuation thereby. With the introduction in recent years of vehicle security systems in which a steering column lock is locked and unlocked by an electronic controller connected to one or more steering column lock actuators, there is little need to locate a vehicle's ignition control (e.g., switch, button, and the like) adjacent to the steering column lock. The ignition control can be directly or indirectly connected to the steering column lock by wiring alone, and therefore can be located almost anywhere in the vehicle. However, without the ability of a user to mechanically manipulate the lock bolt as in most older steering column lock designs described above, reliable lock bolt disengagement can be a significant problem, particularly when the lock bolt is subjected to binding forces.

Other design concerns with steering column locks include lock complexity and lock manufacturability. Conventional steering column locks typically fail to address these concerns well. By way of example only, many steering column locks are assembled from a relatively large number of parts connected and fastened together in a time-consuming and expensive assembly process. In addition, little concern is normally paid to the complexity of the parts in many conventional steering column locks, thereby significantly increasing the manufacturing costs and end prices of such locks. Lock complexity can also lead to increased potential for lock assembly errors, operational problems and even malfunction.

In light of the problems and limitations of the prior art described above, a need exists for a steering column lock that is relatively simple, is easy and relatively inexpensive to manufacture and assemble, does not require mechanical actuation by a user, can be controlled and operated electronically, reliably locks the steering column even if rotating, and reliably unlocks the steering column even if the lock bolt is subjected to binding forces. Each preferred embodiment of the present invention achieves one or more of these results.

SUMMARY OF THE INVENTION

Preferred embodiments of the present invention have a lock bolt that is extendible and retractable by movement of a power transmission assembly. In some preferred embodiments of the invention, the power transmission assembly is rotatable by an actuator and has a cam thereon which engages a cam follower coupled to the lock bolt to retract the lock bolt and unlock the steering column. By employing a worm and worm gear set connecting the actuator to the power transmission assembly, the power transmission assembly can be provided with sufficient torque to extract the lock bolt even if held by relatively strong binding forces. The steering column lock of this preferred embodiment therefore does not require a user to reduce the binding forces upon the lock bolt (e.g., turn the steering column) prior to unlocking the lock assembly. Also, the steering column lock can therefore be located any distance from the vehicle's user-manipulatable ignition control and need not be mechanically connected thereto.

The lock assembly of most highly preferred embodiments of the present invention can preferably be controlled by activation and deactivation of the actuator to permit the lock bolt to extend in a locking operation and to extract the lock bolt via the power transmission assembly in an unlocking operation. Preferably, one or more sensors directly or indirectly connected to the actuator can be used to trigger deactivation of the actuator when the lock bolt has been sufficiently moved to its locked and unlocked positions. Although the sensors can be positioned to detect a number of different moving elements in the lock assembly in a number of different manners, highly preferred embodiments employ mechanically-tripped sensors positioned adjacent to the cam and tripped by rotation of the cam at cam positions corresponding to extended and retracted positions of the lock bolt.

In some preferred embodiments, the cam has a curved surface with varying distance from the axis of rotation of the cam or pivot. The cam therefore produces smooth and controlled lock bolt camming action with little to no jarring motion (which can reduce the life of a lock bolt assembly). The cam preferably has a rotund shape such as an elliptical, round, or egg shape, and most preferably has an oval shape with initial and trailing ramping surfaces and a steeper intermediate ramping surface upon which the lock bolt rides at least when moving to an unlocked position. This cam shape provides superior lock bolt extraction even in binding conditions of the lock bolt.

In order to significantly reduce manufacturing and assembly time and cost of the steering column lock, some or all of the power transmission assembly is preferably assembled prior to being installed in a lock assembly frame. In some preferred embodiments, the power transmission assembly includes a pivot pivotably mounted to the frame and upon which are located a gear for transmitting driving power from the actuator to the pivot and a cam for transmitting rotational power from the pivot to the lock bolt. In such embodiments, the gear and/or the cam are preferably mounted upon the pivot to define a power transmission assembly that can be mounted upon the frame as a single unit. More preferably, the gear and/or the cam are integral with the pivot for this same purpose, thereby further reducing assembly and manufacturing time of the present invention. In those embodiments employing bearings for pivotably mounting the power transmission assembly, the bearings can also be assembled upon the pivot or can be made integral therewith prior to installation of the power transmission assembly as just described.

Preferably, part or all of the lock assembly can be assembled without turning, flipping, or otherwise re-orienting the lock assembly during the assembly process. To this end, some or all of the lock assembly components are preferably installed in the lock assembly from the same side of the lock assembly. In one highly preferred embodiment for example, all of the lock assembly components are mounted upon the frame from one side thereof, including the pivot, cam, and worm gear of the power transmission assembly, the lock bolt, the actuator and worm connected thereto, sensors for controlling deactivation of the actuator, and a lock assembly cover. This manner of assembly simplifies assembly operations, increases the speed at which the present invention can be assembled, reduces assembly error, and can therefore significantly reduce the cost of the lock assembly.

The present invention therefore provides an apparatus and method for locking a steering column that is simple in construction, is fast and easy to manufacture and assemble, can be controlled and operated electronically, reliably functions to lock and unlock the steering column of a vehicle, and can be employed in applications where no mechanical connection exists between a manually actuated ignition and the steering column lock or where a manually actuated ignition does not exist at all. More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

Figure 1:
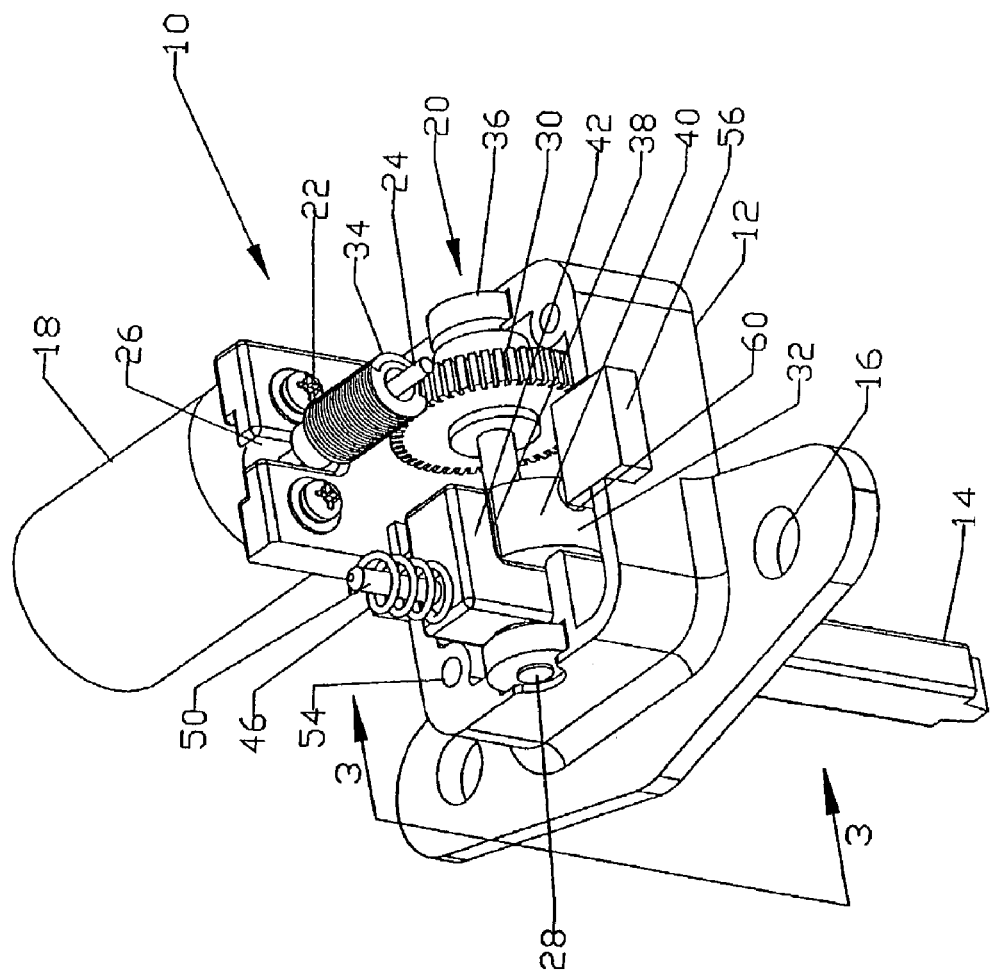
FIG. 1 is a perspective view of a steering column lock assembly according to a preferred embodiment of the present invention, shown with the cover removed.
Figure 2:
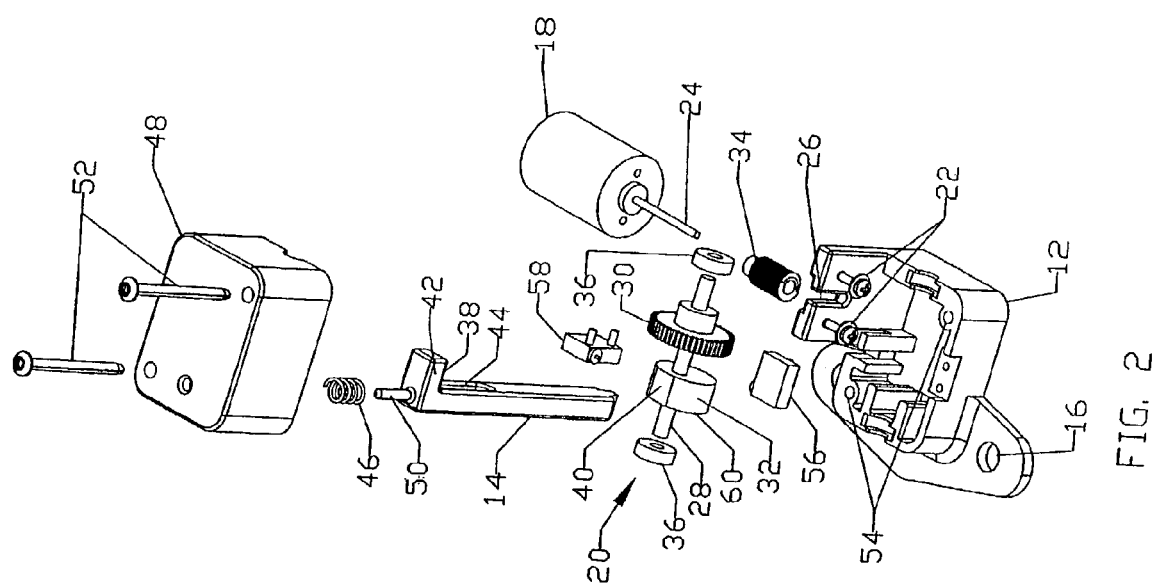
FIG. 2 is an exploded perspective view of the steering column lock assembly illustrated in FIG. 1.

With reference first to FIGS. 1 and 2 which show one highly preferred embodiment of the present invention, the lock apparatus 10 preferably has a frame 12 within which is received a lock bolt 14 that can be extended and retracted to lock and unlock a steering column (not shown), respectively. When extended, the lock bolt 14 preferably engages within teeth of a gear (also not shown) mounted on the steering column in a manner well known to those skilled in the art, thereby preventing the steering column from being rotated by a user. Alternatively, the lock bolt 14 can extend into engagement within a groove, slot, recess, or other aperture in any element connected to the steering column or even in the steering column itself. Like the lock bolt engagement with the gear teeth just described, the engaged lock bolt in such alternative embodiments operates to prevent steering column rotation.

The lock apparatus 10 is preferably mounted adjacent to the steering column by conventional threaded fasteners passed through apertures 16 in the lock apparatus frame 12. The lock apparatus 10 can be mounted adjacent to the steering column in any other conventional manner, such as by being mounted to framework of the vehicle (or to elements or structure near or surrounding the steering column) with welds, rivets, clamps, and the like. The various manners in which steering column locks can be secured within a vehicle are well known to those skilled in the art and are not therefore described further herein. Any such manner can be employed in conjunction with the present invention.

The frame 12 can take any shape desired, limited only by the ability to mount other lock assembly components thereto as described in more detail below. In the illustrated preferred embodiment for example, the frame 12 is a compact structure having a substantially flat face facing the steering column. In other preferred embodiments, the lock apparatus 10 can be adapted to fit around at least a portion of a steering column. For example, the frame 12 can have one or more walls shaped to cup or otherwise fit around a steering column. The walls can partially or fully support the steering column, can guide the steering column in its rotation by a user, and/or can at least partially enclose the lock bolt 14 and the recess mating therewith.

The lock assembly 10 preferably further includes an actuator 18 and a power transmission assembly 20 coupled to the lock bolt 14. It should be noted that as used herein and in the appended claims, when one element is said to be "coupled" to another, this does not necessarily mean that one element is fastened, secured, or otherwise attached to another element. Instead, the term "coupled" means that one element is either connected directly or indirectly to another element or is in mechanical or electrical communication with another element. Examples include directly securing one element to another (e.g., via welding, bolting, gluing, frictionally engaging, mating, etc.), elements which can act upon one another (e.g., via camming, pushing, or other interaction such as the preferred relationship between the power transmission assembly 20 and the lock bolt 14 in the illustrated embodiment), one element imparting motion directly or through one or more other elements to another element, and one element electrically connected to another element either directly or through a third element.

The actuator 18 is preferably secured to the frame 12 by one or more threaded fasteners 22. Although the actuator 18 can be secured directly to the frame 12 as shown in the figures the actuator 18 can be secured to a mounting bracket, frame, or other structure connected to the frame 12. As an alternative to the use of threaded fasteners 22 to mount the actuator 18, the actuator 18 can be secured by welds, by mating fasteners on the frame 12 and the actuator, and the like. The actuator 18 can be located substantially outside of the frame 12 as shown in the figures or can be located partially or fully within the frame 12 as desired.

In some highly preferred embodiments, the actuator 18 is a conventional electric motor having an output shaft 24 as shown in FIGS. 1–4. The motor 18 is preferably a conventional reversible electric motor, but can be a non-reversible motor in other embodiments. To mount the motor 18 as described above, the frame 12 preferably has a wall with a notch or other recess 26 therein for receiving the output shaft 24 of the motor 18. Most preferably, the notch or recess 26 helps to correctly position the motor 18 with respect to the frame 12 and the power transmission assembly 20, and permits an assembler to install the motor 18 from the same side of the frame 12 as the other parts of the lock assembly 10 described below (such as from the top of the frame 12 as shown in the figures). Although any other type of aperture in the frame 12 can be used for the output shaft 24, such as a hole through the frame wall into which the output shaft 24 is received from the side of the frame 12, the notch 26 serves both to easily guide the motor 18 into correct position and to enable lock assembly from one side of the frame 12 without movement of the frame 12. This feature simplifies assembly operations and reduces assembly time.

Preferred embodiments of the present invention employ a camming action between the power transmission assembly, 20 and the lock bolt 14 for retracting the lock bolt 14. In the highly preferred embodiment of FIGS. 1–4, the power transmission assembly 20 is rotated to generate this camming action, and includes a pivot 28 upon which a worm gear 30 and a cam 32 are located. In this embodiment, a worm 34 mounted upon the output shaft 24 of the motor 18 is turned by the motor 18 and thereby turns the gear 30 to turn the pivot 28 and cam 32. The worm 34 is preferably secured to the output shaft 24 of the motor 18 by a setscrew in a threaded aperture in the worm 34 (not shown), but can be secured thereto in any other conventional manner, such as by being keyed thereon, by an interference fit, by a compression fit, by being threaded upon a threaded portion of the output shaft 24, or even by being integrally formed with the output shaft 24. Similarly, the worm gear 30 and/or the cam 32 can be secured upon the pivot 28 in any conventional manner such as those just mentioned with reference to the worm 34 on the output shaft 24. Most preferably, and for purposes that will be described in greater detail below, the worm gear 30 and/or the cam 32 are integral with the pivot 28. The worm gear 30 and cam 32 can be made integral with the pivot 28 in a number of different manners well known to those skilled in the art, such as by being cast, pressed, sintered, machined, molded, and the like.

The worm 34 and worm gear 30 connection between the motor 18 and the power transmission assembly 20 define a speed reduction from the faster turning motor 18 and the slower turning power transmission assembly 20. It should be noted that this speed reduction can be produced in a number of different manners, such as by other gear assemblies (meshing spur gears of different sizes, planet and sun gears, etc.), belt and pulley or chain and sprocket assemblies, and the like. However, a worm 34 and worm gear 30 are most highly preferred due to their relatively compact size, simple operation, and ease of assembly.

Also, the manner in which the motor 18 is drivably connected to the power transmission assembly 20 can be significantly different than as shown in the figures and described above. For example, the motor 18 can be mounted at an end of the power transmission assembly 20 (e.g., connected to the end of the pivot 28 in any conventional manner), can be mounted parallel to the power transmission assembly 20 to drive the power transmission assembly 20 by a set of spur gears, and the like.

The electric motor 18 of the above-described lock assembly 10 is only one type of actuator that can be employed in the present invention. Other types of actuators 18 include without limitation conventional stepper motors, solenoids, hydraulic or pneumatic cylinders, and the like. Different types of actuators can be used to connect and drive the power transmission assembly 20 in different manners. By way of example only, the actuator 18 can be solenoid or cylinder that has an armature or piston, respectively, that can be extended and retracted. The armature or piston can drive a gear 30 on the pivot 28 by teeth, apertures, or ribs on the armature or piston (or on an element connected thereto in any conventional manner) in a manner similar to a rack and pinion assembly. As another example, a motor can be coupled directly to the pivot 28 as described above, in which case the motor can be a relatively low-speed motor if desired. Still other manners of turning the power transmission assembly 20 are possible, are well known to those skilled in the art, and fall within the spirit and scope of the present invention.

Highly preferred embodiments of the present invention employ some type of speed reduction between the actuator 18 and the power transmission assembly 20 as described above. Among other reasons, speed reduction is preferred in order to increase the torque upon the power transmission assembly 20, thereby increasing the camming force exertable by the cam 32. In this manner, relatively high lock bolt extraction forces can be generated by the lock apparatus 10 without employing a large and powerful actuator 18. Although speed reduction is therefore preferred, other embodiments can employ different actuators as desired, thereby potentially eliminating the need for speed reduction parts or components of the lock apparatus 10.

The pivot 28 of the power transmission assembly 20 is preferably rotatably mounted to the frame 12 at its opposite ends as shown in the figures. However, the pivot 28 can instead be rotatably mounted at any point along its length and can even be cantilevered if desired (subject of course to strength requirements of the pivot 28). Preferably, the pivot 28 is mounted to the frame 12 by bearings 36. The bearings 36 can be of any conventional type, including without limitation sleeve bearings, ball bearings, journal bearings, and the like. In one highly preferred embodiment, the bearings 36 are a collar or sleeve of low-friction material such as nylon, plastic, Teflon® (DuPont, Inc.) or UHMW (Ultra-High Molecular Weight) material. In other embodiments, the pivot 28 is received in clips, bosses, or other such structures with a clearance fit permitting rotation of the pivot 28 therein. In still other embodiments, the pivot 28 is pivotably received in one or more apertures in walls of the frame 12. Still other manners of pivotably supporting the pivot 28 on the frame 12 with or without bearings 36 are possible and are well known to those skilled in the art.

As described above, the cam 32 preferably rotates to move the lock bolt 14 toward a retracted position. Specifically, the lock bolt 14 in some preferred embodiments of the present invention has a follower surface 38 which rides upon a cam surface 40 of the cam 32. The follower surface 38 can be defined by a number of different portions of the lock bolt 14 adjacent to the cam 32, and depends at least in part upon the shape of the lock bolt 14. In the illustrated preferred embodiment for example, the lock bolt 14 is substantially L-shaped to define a follower 42 having the follower surface 38. The follower 42 can be integral with the lock bolt 14 or attached thereto in any conventional manner. In other embodiments, the follower surface 38 is defined by other portions of the lock bolt 14 or by a follower attached to or integral with the lock bolt 14.

The lock bolt 14 can take any shape desired, and in some preferred embodiments has a generally elongated shape such as that shown in the figures. The lock bolt 14 can be one element as shown in the figures or can be a number of elements connected together in any conventional manner. For example, the portion of the lock bolt 14 that engages with the steering column or element connected thereto can be made of a relatively high-strength material such as steel or aluminum while the remainder of the lock bolt 14 can be made of plastic or other lower-cost material in order to reduce the cost of the lock assembly 10.

In the illustrated preferred embodiment, the lock bolt 14 is located adjacent to the cam 32. This arrangement transmits forces that are substantially aligned along the lock bolt 14 (forces that are most effective in extracting the lock bolt 14 if bound). This arrangement is also desirable because it helps to minimize torque forces upon the lock bolt 14 resulting from camming action between the lock bolt 14 and the cam 32. Also, this arrangement helps to provide a compact lock assembly 10. Most preferably, the lock bolt 14 is located immediately beside the cam 32 as shown in the figures although the elongated portion of the lock bolt 14 can be disposed from the cam 32 in other embodiments if desired.

Figure 3:
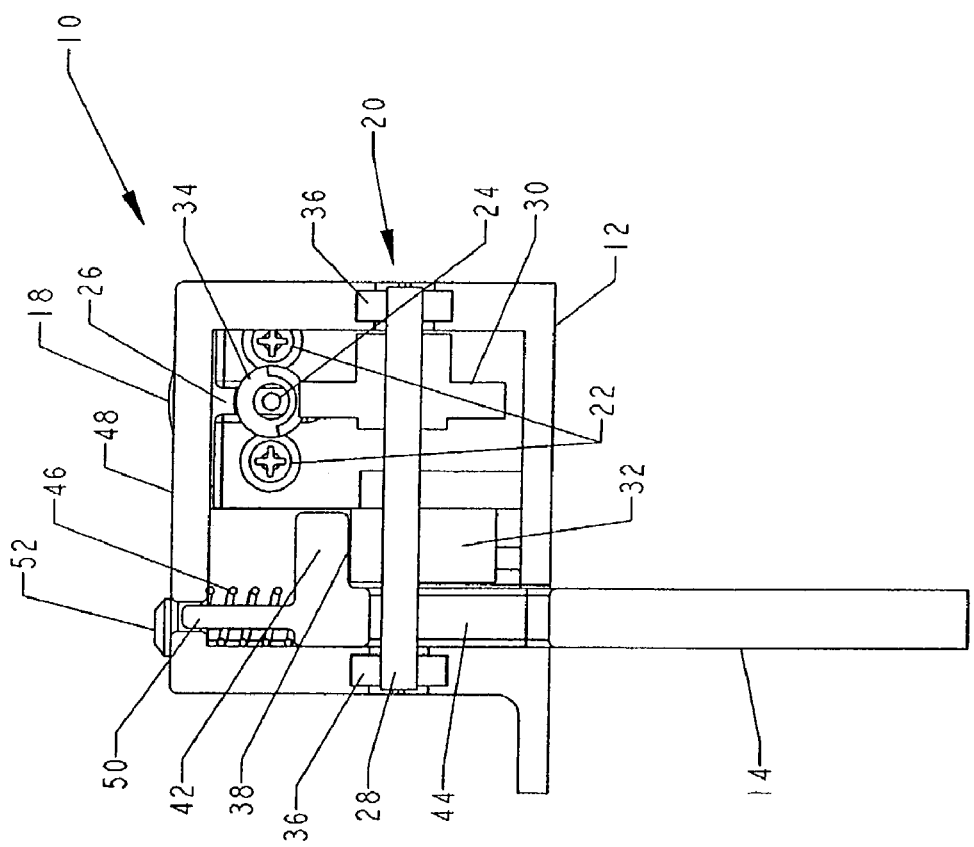
FIG. 3 is a cross-sectional view of the steering column lock illustrated in FIGS. 1 and 2, taken along lines 3—3 of FIG. 1 and showing the steering column lock in an engaged and locked state.
Figure 4:
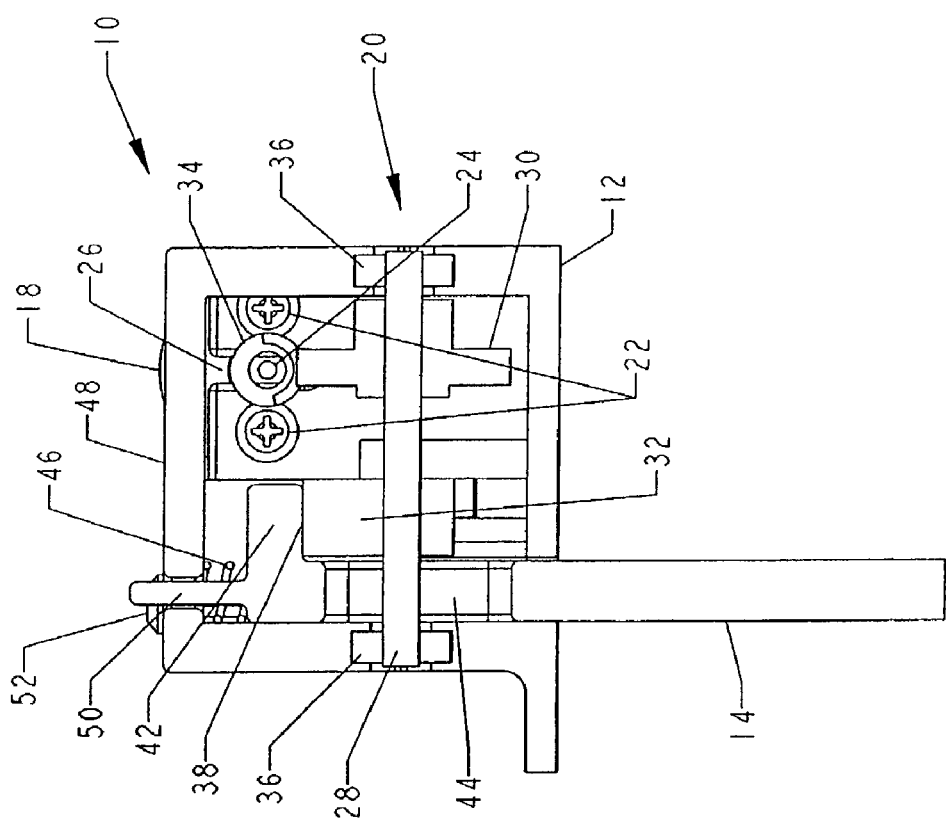
FIG. 4 is a cross-sectional view of the steering column lock illustrated in FIG. 3, showing the steering column lock in a disengaged and unlocked state.

With particular reference to FIGS. 2–4, the lock bolt 14 in some highly preferred embodiments has an aperture 44 therethrough in which the pivot 28 is received. The aperture 44 can extend partially through the lock bolt 14 (such as where the pivot 28 is cantilevered as described above) or fully through the lock bolt 14 as shown in the figures. The aperture 44 can take any shape and size, but is sufficiently large to permit the lock bolt 14 to move with respect to the pivot 28. In the illustrated preferred embodiment for example, the aperture 44 is elongated. By locating the lock bolt 14 so that the pivot 28 is partially or fully received therein, the resulting lock assembly structure is compact and forces are efficiently and effectively transmitted to the lock bolt 14 as described above. However, the lock bolt 14 in other embodiments can be located close to the cam 32 without receiving any part or all of the pivot 28. For example, the lock bolt 14 can be located to a side of the cam 32 and can have a foot extending over the cam 32 for actuation thereby. As another example in which a cantilevered pivot 28 is employed, the cantilevered end of the pivot 28 can end in the cam 32 rather than extend into the lock bolt 14.

The cam 32 preferably has a curved cam surface 40 of varying distance from the axis of rotation of the cam 32 and pivot 28. Such a surface helps to provide smooth operation of the lock assembly 10 and is found to produce excellent lock bolt extraction results. A number of cam shapes provide a curved camming surface of varying distance from the axis of rotation of the cam 32 and pivot 28. However, in some highly preferred embodiments of the present invention, the cam 32 has an oval shape. Accordingly, the follower surface 38 of the lock bolt 14 preferably rides upon a side portion of the cam 32 when the lock bolt 14 is in its extended and locked position, and rides upon an end portion of the cam 32 when the lock bolt 14 is in its retracted and unlocked position.

Figure 5A:
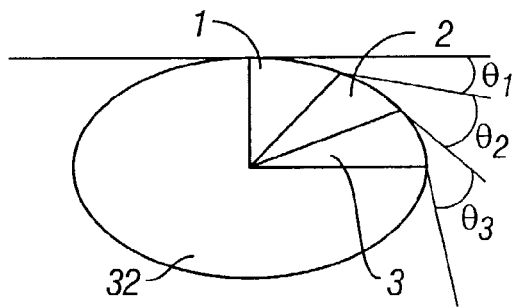
FIGS. 5a–5e are schematic elevational views of a cam according to an embodiment of the present invention, shown rotated through various angles.
Figure 5B:
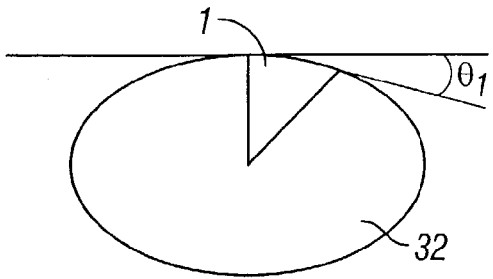
Figure 5C:
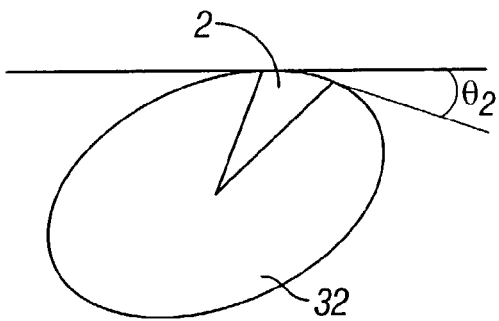
Figure 5D:
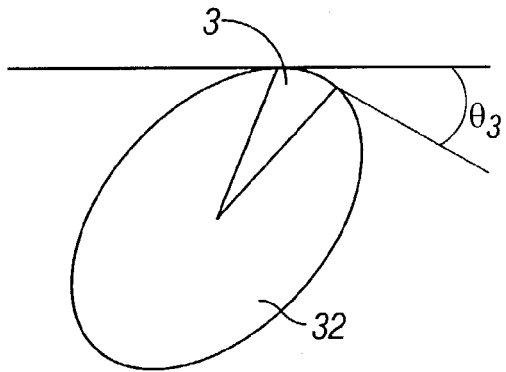
Figure 5E:
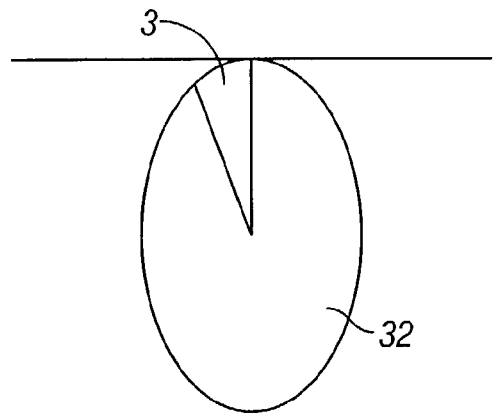

Therefore, when rotated by the pivot 28 from a position corresponding to an extended and locked position of the lock bolt 14, the oval-shaped cam 32 initially ramps relatively slowly (see $\theta_1$ in FIG. 5*b*, indicating an angle the surface of a cam portion 1 presents to the lock bolt 14), thereby providing a high degree of mechanical advantage for the actuator 18 driving the cam 32. Such mechanical advantage is useful in the initial portion of a lock bolt retraction operation where the lock bolt 14 may be bound and therefore resistant to retraction. After an initial ramped portion 1 of the oval-shaped cam 32, the adjacent portion 2 of the cam 32 preferably increases in steepness (see $\theta_2$ in FIG. 5*c*, indicating an angle the surface of the cam portion 2 presents to the lock bolt 14, the angle $\theta_2$ being larger than the angle $\theta_1$), thereby providing for faster lock bolt retraction (e.g., after lock bolt binding forces have been overcome). Finally, a trailing portion 3 of the oval-shaped cam 32 preferably has a decreased steepness in which the retraction forces increase more slowly (see $\theta_3$ in FIG. 5*d*, indicating an angle the surface of the cam portion 3 presents to the lock bolt 14, the angle $\theta_3$ being smaller than the angle $\theta_2$). In some highly preferred embodiments, this provides for deceleration of the lock bolt 14 at the end of lock bolt retraction.

By virtue of its shape as just described, the oval-shaped cam 32 has initial 1, intermediate 2, and trailing 3 ramped portions in which the intermediate ramped portion 2 is steeper $\theta_2$ than the initial 1 and trailing 3 ramped portions. As used herein and in the appended claims, the terms "steep", "steepness", and related terms refer to the angle of tangency $\theta_1$, $\theta_2$, and $\theta_3$ to the cam 32 at the point where the follower surface 38 of the lock bolt 14 rides.

In some highly preferred embodiments, the cam 32 is preferably shaped to provide an initial cam surface portion 1 with a steepness $\theta_1$ of no greater than 10 degrees, an adjacent or intermediate cam surface portion 2 with a steepness $\theta_2$ of no greater than 20 degrees, and a trailing cam surface portion 3 with a steepness $\theta_3$ of no greater than 10 degrees. Most highly preferred cam embodiments have at least one of these cam surface portions, while more preferred cam embodiments have two or more of these cam surface portions. It will be appreciated by one having ordinary skill in the art that a number of cam shapes exist which provide the preferred initial 1, intermediate 2, and trailing 3 cam surface portions described above, each of which is somewhat different in overall shape than the others, and each of which is encompassed by the present invention.

Although an oval cam shape is most preferred, a number of other cam shapes are effective in retracting the lock bolt 14 upon turning of the power transmission assembly 20 while still providing for smooth lock bolt movement. Preferably, the cam 32 is generally rotund in shape, such as an elliptical, football-shaped or egg-shaped cam. Other cam shapes can be less rotund, but preferably do not have adjacent sides at strong angles with respect to one another (e.g., adjacent sides with less than 105 degrees therebetween, or more preferably, adjacent sides with less than 135 degrees therebetween) in order to prevent jarring lock bolt movement and torque spikes.

In yet another preferred embodiment, the cam 32 is generally round in shape and is eccentric with respect to the pivot 28. If desired, other cam shapes can also be eccentric with respect to the pivot 28 to produce the desired lock bolt retracting forces.

The shape of the cam 32 can be at least partially dependent upon whether or not the actuator 18 is reversible. In other words, if the actuator 18 rotates the power transmission assembly 20 a particular amount in one direction to extend the lock bolt 14 and the same or similar amount in an opposite direction to permit retraction of the lock bolt 14, the camming surface 40 may be only a portion of the cam's peripheral surface. In such cases, the remainder of the cam 32 can take any shape desired, as it is largely unimportant to the function of the cam 32. However, in those cases where the actuator 18 rotates in only one direction to both extend the lock bolt 14 and to permit retraction thereof, the cam 32 preferably has one or more surfaces which cam against the lock bolt 14 to permit extension of the lock bolt 14 and the same number of surfaces which retract the lock bolt 14 spaced about the periphery of the cam 32 to result in a symmetrical cam shape.

As alternatives to the above-described camming relationship between the lock bolt 14 and the cam 32, in other embodiments the lock bolt 14 can be moved in other manners by rotation of the power transmission assembly 20. By way of example only, the pivot 28 can instead have a finger, post, arm, or other extension located at a radial distance from the pivot 28 and rotatable by the pivot 28 through an arc to retract the lock bolt 14. Such other manners of transforming rotational motion of the power transmission assembly 20 into linear or substantially linear motion of the lock bolt 14 are well known to those skilled in the art and fall within the spirit and scope of the present invention.

In order to move the lock bolt 14 from a retracted and unlocked position to an extended and locked position, the lock assembly 10 preferably also includes a spring 46 mounted to exert biasing force against the lock bolt 14. The spring 46 is preferably a coil spring compressed between the lock bolt 14 and a cover 48 of the lock assembly 10 as shown in the figures. However, this and any other type of conventional spring can be positioned in a number of other manners still performing the function of biasing the lock bolt 14 toward its extended position. For example, an extension spring can be connected to the lock bolt 14 and to the frame 12 (or even rotatably to the power transmission assembly 20), a leaf spring can be mounted to the underside of the cover 48 to bias the lock bolt 14 away therefrom when the cover 48 is installed upon the frame 12, and the like. Still other manners of biasing the lock bolt 14 as just described include without limitation one or more magnets or magnet sets exerting repelling and/or attractive forces upon the lock bolt 14, an air spring positioned to bias the lock bolt 14, an electromagnetic actuator connected to the lock bolt 14, and the like. As used herein and in the appended claims, the term "spring" therefore refers to any element capable of biasing the lock bolt 14 as described above.

In order to retain the spring 46 in place in the lock assembly 10, a spring retainer 50 can extend from the lock bolt 14, cover 48, or frame 12 (depending at least in part upon the location of the spring 46). Alternatively, the spring 46 can be attached to the lock bolt 14, cover 48, or frame 12 in any conventional manner, such as by one or more screws, rivets, bolts, or other fasteners, by one or more welds, or by adhesive or cohesive material.

The cover 48 of the lock assembly 10 is optional, can be any shape and size, and preferably at least functions to protect the lock components on the frame 12 from dirt, debris, contaminants, and exposure to the surrounding environment. The cover 48 can be attached to the frame 12 by one or more snap fits, by mating pins and apertures, by clips, clasps, clamps, buckles, or other conventional securing devices, and the like. Most preferably however, the cover 48 is attached to the frame 12 by one or more conventional fasteners 52 such as the screws shown in the figures threaded into mating threaded apertures 54 in the frame 12.

The actuator 18 of the present invention can be triggered to perform locking and/or unlocking operations in a number of different manners. In the illustrated preferred embodiment, the electric motor 18 is electrically connected to a vehicle security controller (not shown). When a locking or unlocking operation is desired, the controller activates the motor 18 to begin turning and to thereby move the lock bolt 14. When the lock bolt 14 has reached a desired locked or unlocked position, the electric motor 18 can be deactivated in a number of different manners. In some preferred embodiments, one or more sensors are located adjacent to the power transmission assembly 20 (e.g., adjacent to the cam 32, pivot 28, or gear 30) or adjacent to the lock bolt 14 to detect when the lock bolt 14 reaches desired extended and retracted positions. In the illustrated preferred embodiment for example, two sensors 56, 58 are mounted to the frame 12 adjacent to the cam 32 and are tripped by the cam 32 in its rotation. Each sensor 56, 58 is preferably electrically connected to the vehicle system controller, but can instead be connected directly to the actuator 18 to deactivate the actuator 18 when the sensor 56, 58 is tripped. The sensors 56, 58 are conventional in nature and operation and are preferably mechanically tripped by contact with the rotating cam 32. If desired, the sensors 56, 58 can respond to contact with the camming surface 40 of the cam 32 or to contact with a raised portion on the cam 32 such as a stop 60 in the form of a pin, post, ramp, block, flange, and the like extending from the cam 32.

Some highly preferred embodiments employing two sensors for deactivating the actuator 18 have one sensor 56 tripped by the cam 32 when the cam 32 rotates to a position corresponding to an extended position of the lock bolt 14 (see FIG. 3), and have another sensor 58 tripped by the cam 32 when the cam 32 rotates to a position corresponding to a retracted position of the lock bolt 14 (see FIG. 4). Upon being tripped, the sensors 56, 58 directly or indirectly deactivate the actuator 18 to stop rotation of the power transmission assembly 20.

Although the sensors 56, 58 are shown mounted in a conventional manner to the frame 12, the sensors 56, 58 can be mounted in any conventional manner to the cover 48 or to any other element or structure preferably adjacent to the power transmission assembly 20 or lock bolt 14. In alternative embodiments, the sensors 56, 58 can be located to detect the position of the lock bolt 14, cam 32, pivot 28, gear 30, or even the actuator 18 and speed reduction elements connected thereto. Such sensors 56, 58 can be mechanically tripped by stops such as those described above which extend from any of these elements (e.g., radially from the pivot 28, laterally from the lock bolt 14, axially from a side of the gear 30, radially from the output shaft 24 of the motor 18, and the like). In some cases, the sensors 56, 58 can detect the amount of movement of an element in any conventional manner to determine the position of the lock bolt 14, such as by counting the revolutions or amount of revolution of the pivot 28, gear 30, or output shaft 24, by counting equally-spaced protrusions or recesses on the lock bolt 14, etc.

Other manners of detecting the position of the lock bolt 14 are possible by the use of other types of sensors 56, 58. By way of example only, other sensor types include without limitation magnetic sensors for detecting one or more magnetic or ferrous elements on positions of a moving lock assembly component, optical sensors for detecting the proximity of a moving lock assembly component or of color or reflectivity of a portion of the moving lock assembly component, and the like. Still other well known sensor types can be used to directly or indirectly detect the position of the lock bolt 14. In addition, although two sensors are employed in some highly preferred embodiments such as that shown in the figures one having ordinary skill in the art will appreciate that the actuator 18 can be deactivated in the extended and retracted lock bolt positions by only one sensor positioned to detect any of the moving lock assembly components described above. For example, and with reference to the illustrated preferred embodiment, multiple stops can be located on the cam 32 to trip the same sensor in different rotational positions of the cam 32 corresponding to extended and retracted lock bolt positions, respectively. As another example, one sensor can be located adjacent to the lock bolt 14 and can be tripped by two different stops on the lock bolt 14 corresponding to extended and retracted lock bolt positions. In other embodiments, three of more sensors can be employed to detect the position of one or more moving lock assembly components in any conventional manner such as those described above.

Sensors are the preferred manner of triggering actuator shutoff in the lock assembly 10 of the present invention. However, other manners of triggering actuator shutoff exist and can be used in place of or in addition to the use of sensors. For example, the actuator 18 can have a predetermined amount of rotation or travel in its rotation of the power transmission assembly 20. In this regard, the actuator 18 can be a stepper motor rotating only that amount necessary to retract or permit extension of the lock bolt 14 to desired unlocked and locked positions, can be a solenoid extending and retracting an armature an amount sufficient to perform these same functions, and the like. In another example, the actuator 18 can be connected to a controller (e.g., the vehicle security controller or another controller) that supplies power to the actuator 18 for a predetermined amount of time corresponding to the time necessary to retract the lock bolt 14 or to permit extension of the lock bolt 14. As another example, a torsion spring can be mounted to the power transmission assembly 20 and to the frame 12 to exert an increasing torque upon the power transmission assembly 20 that eventually prevents further rotation of the power transmission assembly 20 after a desired amount of rotation. As yet another example, the aperture 44 in the lock bolt 14 can be sized such that the pivot 28 stops against an end of the aperture 44 after the lock bolt 14 has moved a desired amount, thereby preventing further movement of the lock bolt 14 in the same direction. In the latter two examples in particular, actuator shutoff can be triggered automatically by detection of actuator overload, by timing out of actuator operation, and in other conventional manners well known to those skilled in the art. Still other manners of retracting and permitting extension of the lock bolt 14 with or without the use of sensors would be recognized by those skilled in the art and fall within the spirit and scope of the present invention.

In operation of the illustrated preferred embodiment, when the lock assembly 10 is to be unlocked, one or more signals are transmitted (preferably by a connected vehicle security controller) to the electric motor 18 to initiate retraction of the lock bolt 14. The motor 18 responds by turning the worm 34 and gear 30 to rotate the pivot 28 and cam 32. The speed reduction offered by the worm 34 and gear 30 provides significant torque to the pivot 28. This torque is sufficient to draw the lock bolt 14 from engagement with a steering column or element connected thereto even if the lock bolt 14 is held by relatively large binding forces. Preferably, the power transmission assembly 20 rotates until the stop 60 on the cam trips the sensor 56. The stop 60 and sensor 56 are preferably relatively located on the cam 32 and frame 12 so that the sensor 56 is tripped at a fully retracted position of the lock bolt 14. The tripped sensor 56 responds by sending one or more signals to the controller or to the actuator 18 to stop the actuator 18. The lock assembly 10 is therefore in an unlocked state permitting the steering column to be rotated.

To lock the steering column again, one or more signals are preferably transmitted to the electric motor 18 to initiate rotation of the power transmission assembly 20 (in the same or opposite direction as described above preferably depending at least in part upon the shape of the cam 32). The worm 34 is turned by the motor 18, thereby turning the gear 30, pivot 28, and cam 32. In this rotation, the cam 32 permits the lock bolt 14 to extend toward a locked position under biasing force from the spring 46. The power transmission assembly 20 preferably rotates until the stop 60 on the cam 32 trips the sensor 58. The stop 60 and sensor 58 are preferably relatively located on the cam 32 and frame 12 so that the sensor 58 is tripped once the lock bolt 14 is permitted to fully extend to a locked position (as described below, the lock bolt 14 may not be properly aligned to actually move to this position, although the cam 32 has been sufficiently rotated to permit such movement). The tripped sensor 58 responds by sending one or more signals to the controller or to the actuator 18 to stop the actuator 18. The lock assembly 10 is therefore in a locked state preventing rotation of the steering column. In the event that the lock bolt 14 does not engage with the aperture, groove, teeth, or other structure of the steering column (or element connected thereto) due to misalignment of the lock bolt 14 therewith, the lock bolt 14 preferably remains biased by the spring 46 toward its locked position. Therefore, when the lock bolt 14 becomes properly aligned with the aperture, groove, teeth, or other structure, the lock bolt 14 will fully extend to its locked position to lock the steering column.

The design of the lock assembly according to the present invention offers a number of advantages related to the assembly and manufacture of the lock assembly 10. The power transmission assembly 20 is preferably a single unit that can be assembled in advance of its installation upon the frame 12. Preferably, the gear 30 and/or the cam 32 are mounted upon the pivot 28 prior to installation of the power transmission assembly 20. More preferably, the gear 30 and cam 32 are both mounted upon the pivot 28 prior to its installation. Most preferably, the gear 30, cam 32, and bearings 36 are mounted upon the pivot 28 prior to being mounted in the frame 12. The pivot 28, gear 30, cam 32, and bearings 36 are therefore mounted within the frame 12 as a single unit rather than being assembled in part or in whole while in the frame 12. This is a structural feature of the present invention that stands in contrast to conventional lock assemblies in which the power transmission structure cannot be installed in or removed from the frame or housing of the lock assembly without first being at least partially disassembled. The preferred structure and manner of assembly of the present invention therefore saves time, streamlines the assembly process, and significantly reduces manufacturing costs of the lock assembly 10. In some highly preferred embodiments, any or all of the elements on the pivot 28 (e.g., the gear 30, cam 32, and bearings 36) are integrally formed with the pivot 28, such as by being cast, pressed, sintered, machined, molded, and the like with the pivot 28. Such embodiments are even more preferred because they further reduce time and costs associated with the manufacture and assembly of the lock assembly 10.

In some highly preferred embodiments, the lock bolt 14 is assembled upon the power transmission assembly 20 prior to mounting the lock bolt 14 and power transmission assembly 20 to the frame 12. Although this manner of assembly is preferably employed with integrally-formed power transmission assemblies as described above, it can also be used in conjunction with power transmission assemblies that are partially or fully assembled prior to installation in the frame 12 as also described above. By assembling the lock bolt 14 and power transmission assembly 20 prior to being mounted upon the frame 12, the assembly process can be significantly streamlined and accelerated. Internal component assemblies can be formed and/or assembled earlier without being assembled in the confines of the frame 12 and with fewer chances of assembly line interruption.

Other significant advantages of the present invention result from the manner in which the lock assembly 10 can be assembled from one side of the lock assembly 10. Specifically, in some highly preferred embodiments, the power transmission assembly 20, the lock bolt 14, and/or the actuator 18 can be connected to the frame 12 from one side thereof. More preferably, all of these components can be connected to the frame 12 from one side thereof. In this manner, the assembler is not required to turn, flip, or otherwise re-orient the assembly 10 during the assembly process. Instead, these components can preferably be "dropped in" the frame 12 and connected thereto with minimal effort. This significantly eases and streamlines assembly, thereby reducing assembly time and cost, and can also reduce assembly errors. When combined with a partially or fully pre-assembled or integral power transmission assembly 20 and a cover 48 that can be installed from the same side of the frame 48 as shown in FIGS. 1 and 2, the resulting lock assembly 10 is a very efficiently manufactured device.

The frame 12, cover 48, power transmission assembly 20, and worm 34 are preferably manufactured from a strong and resilient material such as steel, aluminum, or other metal, plastic, urethane, fiberglass, or composites (useful for meeting non-sparking application requirements or in applications where the lock assembly 10 cannot be made of conductive material), and the like. Most preferably however, the frame 12 and cover 48 are made of a high-strength plastic, the worm 34 is made of plastic (and more preferably, metal), and the power transmission assembly 20 is made of a cast zinc or other metal.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the power transmission assembly 20 preferably has an identifiable pivot 28 upon which the gear 30 and cam 32 are located. However, other preferred embodiments of the power transmission assembly 20 may not have an identifiable pivot 28, or can have a pivot 28 which is defined by the gear 30 and cam 32. Accordingly, in some embodiments the power transmission assembly 20 can have only a gear 30 and a cam 32 functioning as described above. In such cases, the gear 30 can abut or be located immediately beside the cam 32. Alternatively, the gear 30 and cam 32 can be a single integral or assembled element, such as a gear having a stepped side acting as a cam or a cam having a toothed shoulder serving as a gear. Where speed reduction to the power transmission assembly 20 is not necessary or in those cases where the actuator 18 is directly drivably connected to the power transmission assembly 20, the power transmission assembly 20 can even be just a cam 32 pivotably mounted to the frame 12.

What is claimed is:

1. A method of moving a lock bolt between a locked and engaged position with respect to a steering column and an unlocked and disengaged position with respect to the steering column, the method comprising:

actively driving a cam with a motor, the cam including a first surface, a second surface, and a third surface;

moving the lock bolt from the locked position toward the unlocked position at a first rate of retraction, the first rate of retraction determined by the first surface;

accelerating retraction of the lock bolt from the first rate of retraction to a second rate of retraction as the lock bolt is moved toward the unlocked position, the second rate of retraction determined by the second surface; and decelerating retraction of the lock bolt from the second rate of retraction to a third rate of retraction as the lock bolt becomes fully disengaged from the steering column, the third rate of retraction determined by the third surface.

2. The method as claimed in claim 1, further comprising:

biasing a follower surface of the lock bolt against the cam; and rotating the cam to move the lock bolt from the locked position toward the unlocked position via cam action against the follower surface.

3. The method as claimed in claim 2, wherein the first and second rates of retraction are produced by causing the follower surface to ride upon first and second portions of the cam, respectively, the first portion of the cam having a first angle of contact with respect to the follower surface and the second portion of the cam having a second angle of contact with respect to the follower surface, the second angle being larger than the first angles.

4. The method as claimed in claim 3, further comprising stopping rotation of the cam after the lock bolt has been retracted to the unlocked position.

5. The method as claimed in claim 1, further comprising overcoming binding forces between the lock bolt and the steering colunm by moving the lock bolt at the first rate of retraction.

6. The method as claimed in claim 2, wherein:
moving the lock bolt at the first rate of retraction occurs at least in one point of rotation of the cam; and
the lock bolt is moved at the second rate of retraction at least in one point of rotation of the cam;
the method further comprising moving the lock bolt at different rates of retraction in other points of rotation of the cam between the first and second points of rotation.

7. The method as claimed in claim 1 and further comprising reducing a speed of the motor coupled to the lock bolt to provide the first rate of retraction in order to increase an initial torque on the lock bolt.

8. The method as claimed in claim 7 and further comprising providing at least one of a worm and a worm gear, meshing spur gears, planet and sun gears, a belt and a pulley, and a chain and a sprocket in order to reduce the speed of the motor coupled to the lock bolt.

9. The method as claimed in claim 7 and further comprising reducing the speed of the motor.

10. The method as claimed in claim 1 and further comprising increasing a camming force exerted by the cam in order to increase an initial torque on the lock bolt.

* * * * *